(12) United States Patent
Ogawa et al.

(10) Patent No.: US 7,350,777 B2
(45) Date of Patent: Apr. 1, 2008

(54) ENGINE MOUNT

(75) Inventors: Yuichi Ogawa, Kasugai (JP); Akio Saiki, Kasugai (JP); Yoshihiro Kawabata, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 197 days.

(21) Appl. No.: 11/270,744

(22) Filed: Nov. 10, 2005

(65) Prior Publication Data
US 2006/0108725 A1 May 25, 2006

(30) Foreign Application Priority Data
Nov. 19, 2004 (JP) .............................. 2004-336598

(51) Int. Cl.
*F16F 7/00* (2006.01)
(52) U.S. Cl. ................................. 267/141.1; 267/140.4
(58) Field of Classification Search ............. 267/104.5, 267/140.1, 140.5, 141.1, 140.3, 140.4, 212, 267/153
See application file for complete search history.

(56) References Cited

U.S. PATENT DOCUMENTS 5,242,146 A * 9/1993 Tecco et al. ................. 248/638
6,698,733 B1 * 3/2004 Larmande ................... 267/293
6,773,001 B2 * 8/2004 Saiki et al. ............... 267/140.4
7,021,613 B2 * 4/2006 Mikami et al. ............. 267/293

FOREIGN PATENT DOCUMENTS

| JP | A U 60-188632 | 12/1985 |
| JP | A 09-089046 | 3/1997 |
| JP | A 09-151991 | 6/1997 |
| JP | A 2001-003987 | 1/2001 |

* cited by examiner

*Primary Examiner*—Robert A. Siconolfi
*Assistant Examiner*—James Kuang-Yuen Hsiao
(74) *Attorney, Agent, or Firm*—Oliff & Berridge, PLC

(57) ABSTRACT

An engine mount has: a mount body including an upper and lower fitting of plate shape, and a pair of rubber mount elements of block shape; and an inner tube fitting situated within a through-hole in the upper fitting, formed at a location between the pair of rubber mount elements, and a vibration damping bushing integrally vulcanization bonded with the inner tube fitting and the upper fitting, and connecting the inner and upper fittings in the diametrical direction. The pair of rubber mount elements and the bushing rubber are integrally vulcanization molded. A stopper fitting is affixed within the inner tube fitting, with a vehicle front-back direction fitting stopper portion and/or a left-right direction fitting stopper portion being disposed on the stopper fitting, and a corresponding rubber stopper portion is disposed on the upper fitting side, with the fitting stopper portion and the rubber stopper portion being placed abutting one another.

5 Claims, 10 Drawing Sheets

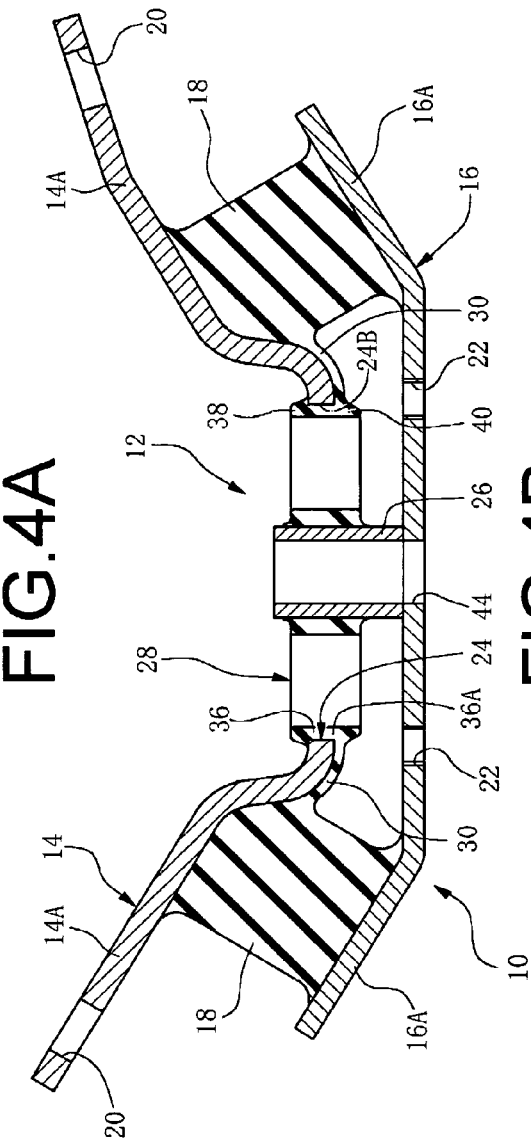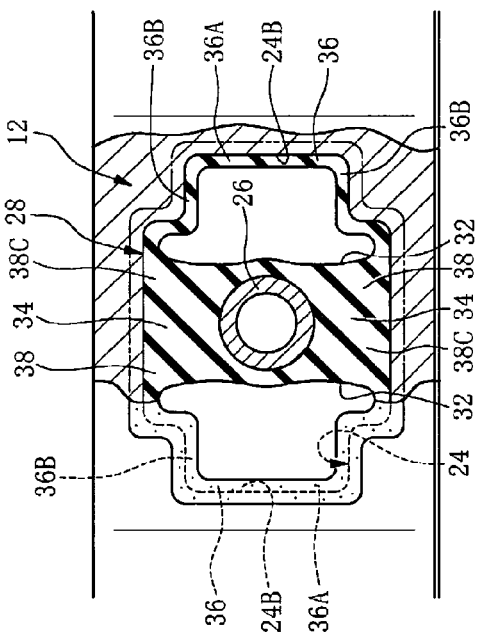

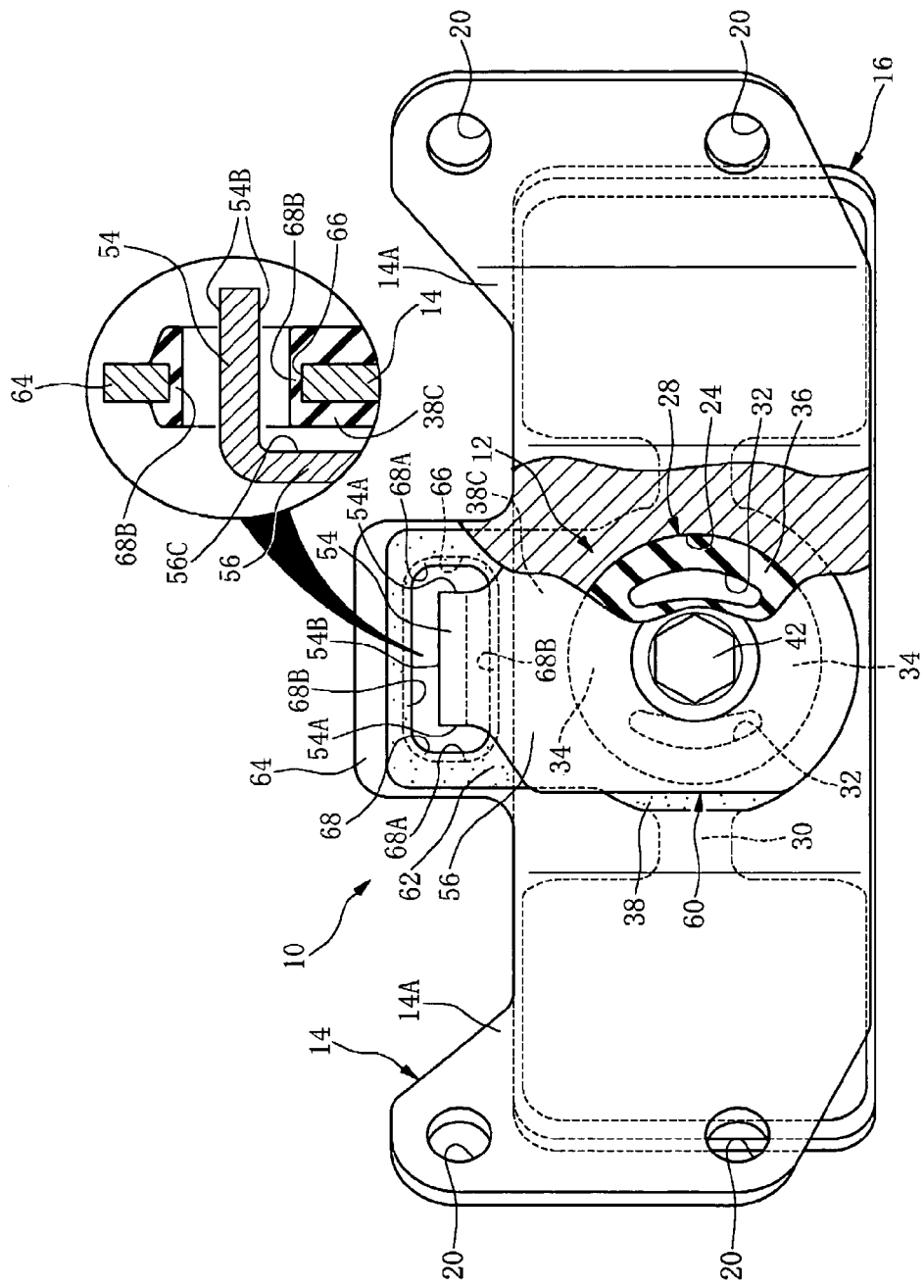

PRIOR ART

ENGINE MOUNT

INCORPORATED BY REFERENCE

The disclosure of Japanese Patent Application No. 2004-336598 filed on Nov. 19, 2004 including the specification, drawings and abstract is incorporated herein by reference in its entirety.

BACKGROUND OF THE INVENTION

1. Field of the Invention

This invention relates in general to an engine mount, and relates in particular to an engine mount having an integrally disposed vibration damping bushing at a location between a pair of block shaped rubber mount elements.

2. Description of the Related Art

One type of engine mount known to date is furnished with a metallic upper fitting and a metallic lower fitting of plate shape, and a pair of integrally vulcanization bonded rubber mount elements of block shape, sandwiched above and below by the upper fitting and a lower fitting. However, in the case of an engine mount of this design, there is the problem that when a constant spring constant in the vertical direction is established for the purpose of properly supporting the engine load or properly exhibiting vibration damping characteristics, the spring constant in the vehicle front-back direction or left-right direction is insufficient.

To solve this problem, JP-A-2001-3987 cited below, it is proposed to integrally attach a vibration damping bushing to a mount body comprising the pair of block shaped rubber mount elements discussed previously. A specific example thereof is depicted in FIGS. 10A and 10B. In the drawing, 200 denotes the mount body, which comprises an upper fitting 202 and a lower fitting 204 of plate shape, and a pair of rubber mount elements 206 of block shape, sandwiched above and below therebetween.

The upper fitting 202 and the lower fitting 204 each bend in a sloping configuration at both the left and right side portions in the drawings, with the rubber mount elements 206 of block shape sandwiched between the sloped portions 202A, 204A and integrally vulcanization bonded to the upper fitting 202 and the lower fitting 204. The pair of rubber mount elements 206 are disposed in a configuration overall that widens out towards the bottom, resembling inverted rabbit ears.

With the upper fitting 202 fastened to the engine side and the lower fitting 204 to the vehicle body side, the mount body 200 elastically supports the engine load with the pair of rubber mount elements 206. As illustrated in FIG. 10B, a through-hole 208 is provided in the upper fitting 202 at a location between the pair of rubber mount elements 206, 206, and a vibration damping bushing 210 constituted as a separate element from the mount body 200 is integrally mounted therein. More specifically, a round tube fitting 212 is affixed to the inside rim of the through-hole 208, and the vibration damping bushing 210 is press-fit into this round tube fitting 212 and thereby mounted fixedly onto the mount body 200.

The vibration damping bushing 210 comprises an inner tube fitting 214 and an outer tube fitting 216. A bushing rubber 218 integrally vulcanization bonded to these and linking the inner tube fitting 214 and the outer tube fitting 216 in the diametrical direction, with the outer tube fitting 216 press-fit into the round tube fitting 212. This vibration damping bushing 210 is also integrally fastened to the lower fitting 204, with the lower end of the inner tube fitting 214 placed in abutment with the lower fitting 204, by means of a fastening arrangement consisting of a bolt 219 passed through the inner tube fitting 214 and a nut 220 threaded thereon. Accordingly, in the vibration damping bushing 210, the inner tube fitting 214 moves in unison with the lower fitting 204, in association with which the bushing rubber 218 undergoes elastic deformation.

FIG. 10A, 222 denotes a stopper fitting of plate shape, secured against the upper end face of the inner tube fitting 214 in the drawing by means of the bolt 219 and the nut 220; vertical stopper action is afforded by means of this stopper fitting 222 and a rubber stopper portion 224—consisting of a corresponding rubber flange portion of the bushing rubber 218—being positioned abutting one another in the vertical direction.

In this example, hollow portions (recesses) 226 that extend in the axial direction are formed in the bushing rubber 218, to the left and right sides of the inner tube fitting 214 in the drawing (which represents the left and right sides of the vehicle body). That is, the hollow portions 226 divide the bushing rubber 218 in the left-right direction of the vehicle body. On the other hand, no hollow portions are disposed to the front and back of the inner tube fitting 214, so that the inner tube fitting 214 and the outer tube fitting 210 are linked directly by the bushing rubber 218.

In the vibration damping bushing 210 of this form, on the basis of rubber elasticity of the vibration damping bushing 210, and specifically the bushing rubber 218, in the front-back direction, it is possible to compensate for the low spring constant (insufficient spring rigidity) in the same direction in the mount body 200, and thus to correct the spring ratio of the spring constant in the vertical direction to the spring constant in the front-back direction.

In the case of the engine mount depicted in FIGS. 10A and 10B, however, the vibration damping bushing 210 is constituted as a separate element from the mount body 200 and is subsequently attached thereto to produce an integral assembly; accordingly, two vulcanization molded parts, i.e. the mount body 200 and the vibration damping bushing 210, are needed as constituent parts for the engine mount, so that there are more parts and an associated increase in cost, and during production of the engine mount it will also be necessary to assemble the vibration damping bushing 210 with the mount body 200, resulting in an increased number of production steps overall, as well as increased cost due to the increase in the number of steps.

In view of the above, the Applicant, in JP-A-9-89046 given below, has proposed an engine mount wherein the mount body and the vibration damping bushing are integrally vulcanization molded; and in particular an engine mount wherein a pair of rubber mount elements of block shape and a bushing rubber are integrally vulcanization molded during vulcanization in a condition of being connected together. In the case of the engine mount taught in JP-A-9-89046, it is possible to constitute the mount body and the vibration damping bushing, which in the past were separate vulcanized components, as a single vulcanized component, and to accordingly reduce the number of vulcanized components required; and additionally to eliminate the subsequent assembly step, thus affording the advantage of reduced cost of the engine mount.

However, subsequent research has shown that where the rubber mount elements and the bushing rubber are integrally molded in this way, there is a risk that the bushing rubber, i.e. the vibration damping bushing, will lack adequate durability. In the case of the engine mount of FIGS. 10A and 10B taught in JP2001-3987, i.e. where the mount body 200 and the vibration damping bushing 210 are constituted as separate vulcanized components, it is possible for the rubber material of the rubber mount elements 106 to differ from the rubber material of the bushing rubber 218, so that the rubber hardness of the bushing rubber 218 can be made greater than the rubber hardness of the rubber mount elements 206. With this arrangement, it becomes possible, for example, to increase spring rigidity in the aforementioned front-back direction, and to thereby suppress deformation of the bushing rubber 218 in the same direction, to afford better durability thereof.

On the other hand, where an engine mount is integrally molded from rubber mount elements and a bushing rubber as taught in JP-9-89046, there is no choice but to fabricate the rubber mount elements and the bushing rubber of the same rubber material. In such instances, it is not possible to set the rubber hardness of the bushing rubber to appropriate hardness as needed, and as a result there is the problem that the spring rigidity (spring constant) of the bushing rubber in the front-back direction, i.e. the spring constant of the entire engine mount in the front-back direction, tends to be insufficient, and the bushing rubber tends to undergo appreciable deformation (compressive elastic deformation) in the same direction, as a result of which the durability of the bushing rubber is diminished.

While the preceding discussion pertains to increasing spring constant in the front-back direction by means of the bushing rubber, there are also instances in which it is necessary to have a high spring constant in the left-right direction of the vehicle, for the purpose of limiting displacement in the left-right direction of a sports car or the like; when a bushing rubber is subjected to compressive elastic deformation in the left-right direction, the problem of diminished durability of the bushing rubber in the same direction will occur.

SUMMARY OF THE INVENTION

It is an object of the present invention to provide an engine mount equipped with a vibration damping bushing, that requires fewer parts and fewer assembly steps so that production costs can be reduced, that provides good limitation of displacement in the vehicle front-back direction, left-right direction, or both the front-back direction and left-right direction, and that affords enhance durability of the vibration damping bushing.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides an engine mount comprising: a mount body including an upper fitting and a lower fitting of plate shape, and a pair of rubber mount elements of block shape, positioned spaced apart from one another while sandwiched above and below by the upper fitting and a lower fitting, and integrally vulcanization bonded to the upper fitting and the lower fitting; and a vibration damping bushing including an inner tube fitting situated within a through-hole in the upper fitting, formed at a location between the pair of rubber mount elements, and a bushing rubber integrally vulcanization bonded with the inner tube fitting and the upper fitting, and connecting the inner tube fitting and the upper fitting in a diametrical direction, the inner tube fitting being fixed to the lower fitting, wherein the pair of rubber mount elements and the bushing rubber are integrally vulcanization molded of identical rubber material while connected to each other, and wherein at least one of a vehicle front-back direction stopper portion and a left-right direction stopper portion is fixedly provided on a side of the inner tube fitting, while a corresponding rubber stopper portion is fixedly provided on a side of the upper fitting so that the stopper portion and the rubber stopper portion are able to come into abutment with each other in at least one of a vehicle front-back direction and a left-right direction.

A second mode of the invention provides an engine mount according to the aforementioned first mode, further comprising a stopper fitting affixed to the inner tube fitting and provides at least one of a vehicle front-back direction fitting stopper portion and a left-right direction fitting stopper portion in order to function as the stopper portion.

A third mode of the invention provides an engine mount according to the aforementioned second mode, wherein the stopper fitting further provides a vertical direction fitting stopper portion, and a corresponding vertical direction rubber stopper portion is disposed on the upper fitting side so as to be able to come into abutment with the vertical direction fitting stopper portion in a vertical direction.

A fourth mode of the invention provides an engine mount according to the aforementioned second or third mode, wherein axial direction hollow portions are disposed in the bushing rubber, and the stopper fitting includes stopper pieces inserted into the hollow portions and constituting the at least one of a vehicle front-back direction fitting stopper portion and a left-right direction fitting stopper portion in order to function as the stopper portion, while peripheral edge portions of the hollow portions in the bushing rubber constitute the corresponding rubber stopper portion.

A fifth mode of the invention provides an engine mount according to the aforementioned third mode, wherein the stopper fitting includes a stopper piece extending along an upper face of the upper fitting from an end face of the inner tube fitting on an opposite side from a lower fitting, with the stopper piece constituting the vertical direction fitting stopper portion, while a protruding portion that protrudes upward from the upper face of the upper fitting is formed along the peripheral edge of the through-hole in the bushing rubber, with the protruding portion constituting the vertical direction rubber stopper portion.

A sixth mode of the invention provides an engine mount according to any one of the aforementioned first through fifth mode, wherein the vibration damping bushing is subjected to vulcanization molding in a state with one end of the inner tube fitting on the lower fitting side being disposed in abutment with the lower fitting with no gap therebetween, prior to attachment to a vehicle and during molding.

The invention as set forth hereinabove comprises the rubber mount elements and the bushing rubber integrally vulcanization molded of identical rubber material while in a state of being connected together. On the inner tube fitting side, the vehicle front-back direction and/or left-right direction stopper portion are provided. A corresponding rubber stopper portion disposed on the upper fitting side, whereby according to the invention, by means of the abutting action of the stopper portion and the rubber stopper portion, displacement of the bushing rubber in the front-back direction or the left-right direction, or both the front-back and left-right directions, can be reliably limited to no more than a predetermined level, and the problem of diminished durability of the bushing rubber due to appreciable deformation in these directions can be solved. Additionally, since the rubber mount elements and the bushing rubber are vulcanization molded of identical rubber material, fewer vulcanized components are needed, as are fewer assembly steps, and the manufacturing costs of the engine mount can be reduced. While the stopper portions may be integrally formed with the inner tube fitting, the stopper portions may preferably be formed by a stopper fitting affixed to the inner tube fitting (Second mode). This arrangement may further simplify the manufacture of the engine mount.

In the present invention, vertical direction fitting stopper portions are disposed on the stopper fitting, while a corresponding vertical direction rubber stopper portions are disposed on the upper fitting side, whereby displacement of these elements in the vertical direction can be limited (Third mode). With this arrangement, the problem of diminished durability due to excessive deformation in the vertical direction can be solved.

In the present invention, axial direction hollow portions are disposed in the bushing rubber, while stopper pieces that insert into the hollow portions are disposed on the stopper fitting, with the stopper pieces constituting the front-back direction, left-right direction, or front-back and left-right direction stopper fittings, and the peripheral edge portions of the hollow portions in the bushing rubber constituting corresponding rubber stopper portions (Fourth mode). With this arrangement, the bushing itself can function as the rubber stopper portion, offering the advantage of a simpler structure for the engine mount.

Next, the fourth mode teaches disposing a stopper piece extending along the upper face of the upper fitting from the end face of the inner tube fitting in the vibration damping bushing, on the opposite side from the lower fitting, so as to constitute the vertical direction fitting stopper portion; while a protruding portion that protrudes upward is formed on the bushing rubber, so as to constitute the vertical direction rubber stopper portion, whereby in this case as well, the bushing itself can function as the rubber stopper portion, offering the advantage of a simpler structure overall.

Next, the fifth mode teaches subjecting the vibration damping bushing to vulcanization molding in a state with one end of the inner tube fitting disposed in abutment with the lower fitting with no gap therebetween, prior to attachment to a vehicle and during molding. Where vulcanization molding of the rubber mount elements and the bushing rubber is carried out using a mold in a state producing a gap between the inner tube fitting and the lower fitting, part of the rubber will creep around to the end face of the inner tube fitting due to the gap, creating the problem of leaving rubber burr. The rubber burr occurring in this way can be difficult to subsequently remove, since the gap between the inner tube fitting and the lower fitting is quite narrow. According to the fifth mode, on the other hand, the problem of rubber creeping around to the end face of the inner tube fitting and producing rubber burr can be solved.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIGS. 4A and 4B illustrate a state of the engine mount during vulcanization molding;

FIG. 9 is a partial cross sectional top plane view of an engine mount of construction according to another embodiment of the invention.

DETAILED DESCRIPTION OF PREFERRED EMBODIMENTS

Figure 1:
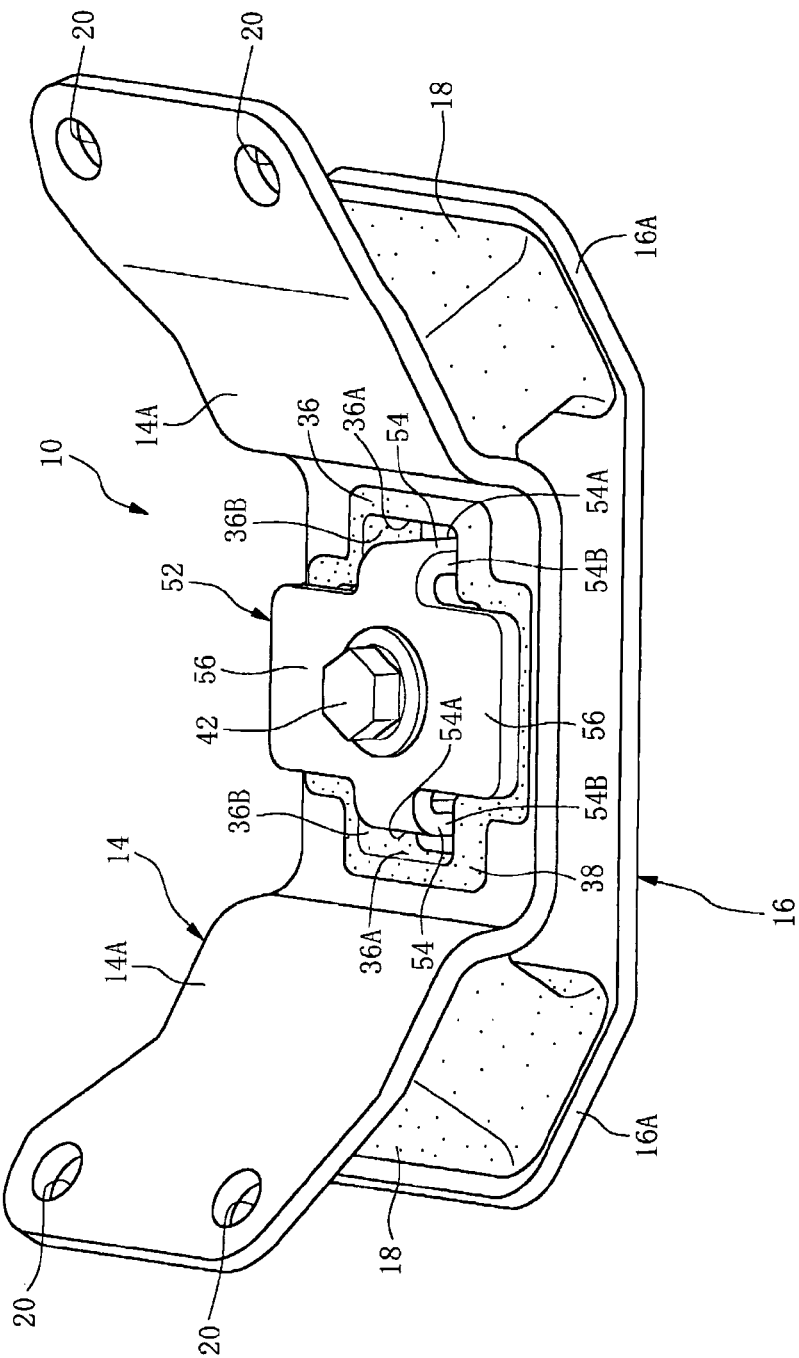
FIG. 1 is a perspective view of an engine mount of construction according to one preferred embodiment of the invention.
Figure 2:
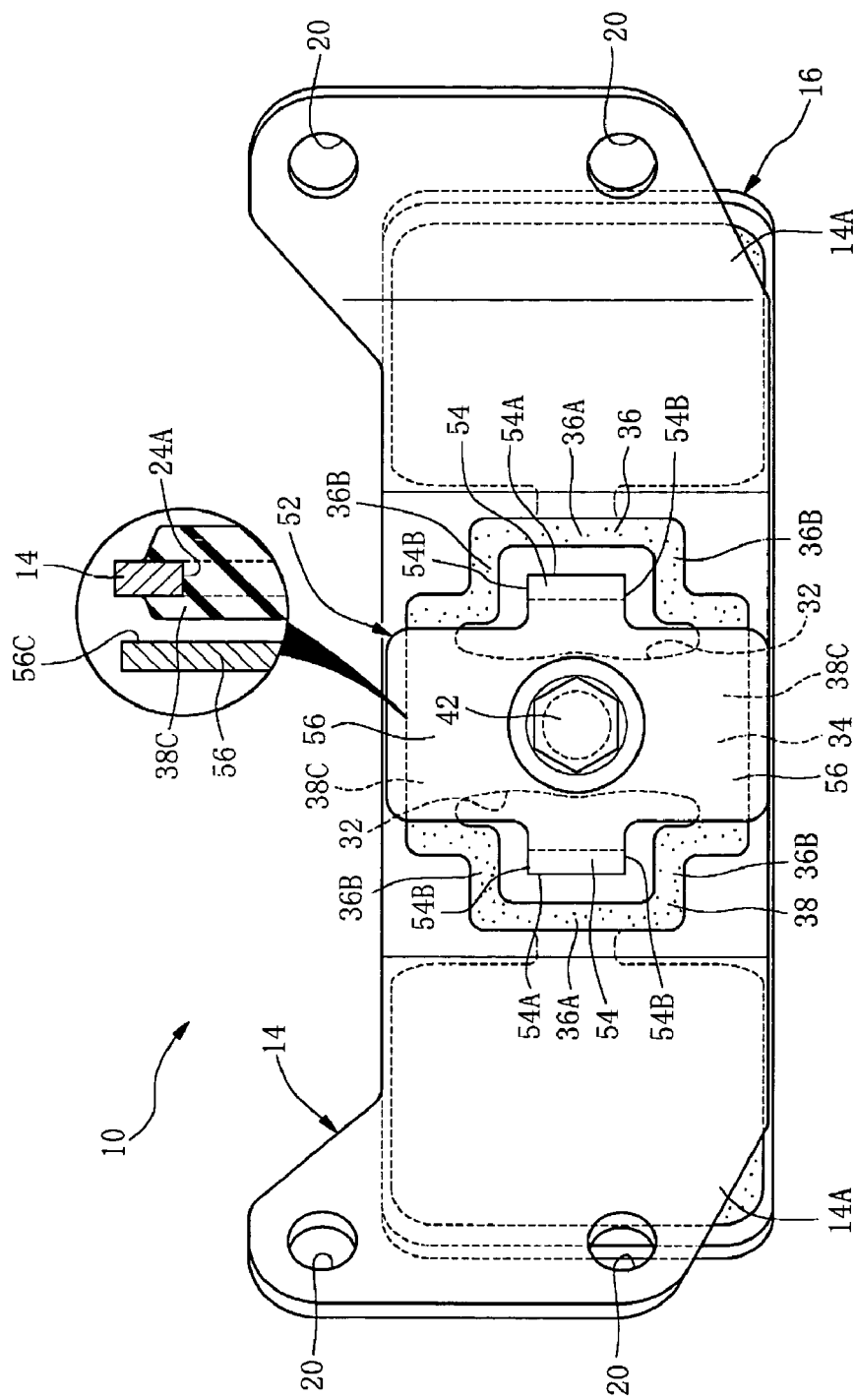
FIG. 2 is a top plane view of the engine mount of FIG. 1.
Figure 3:
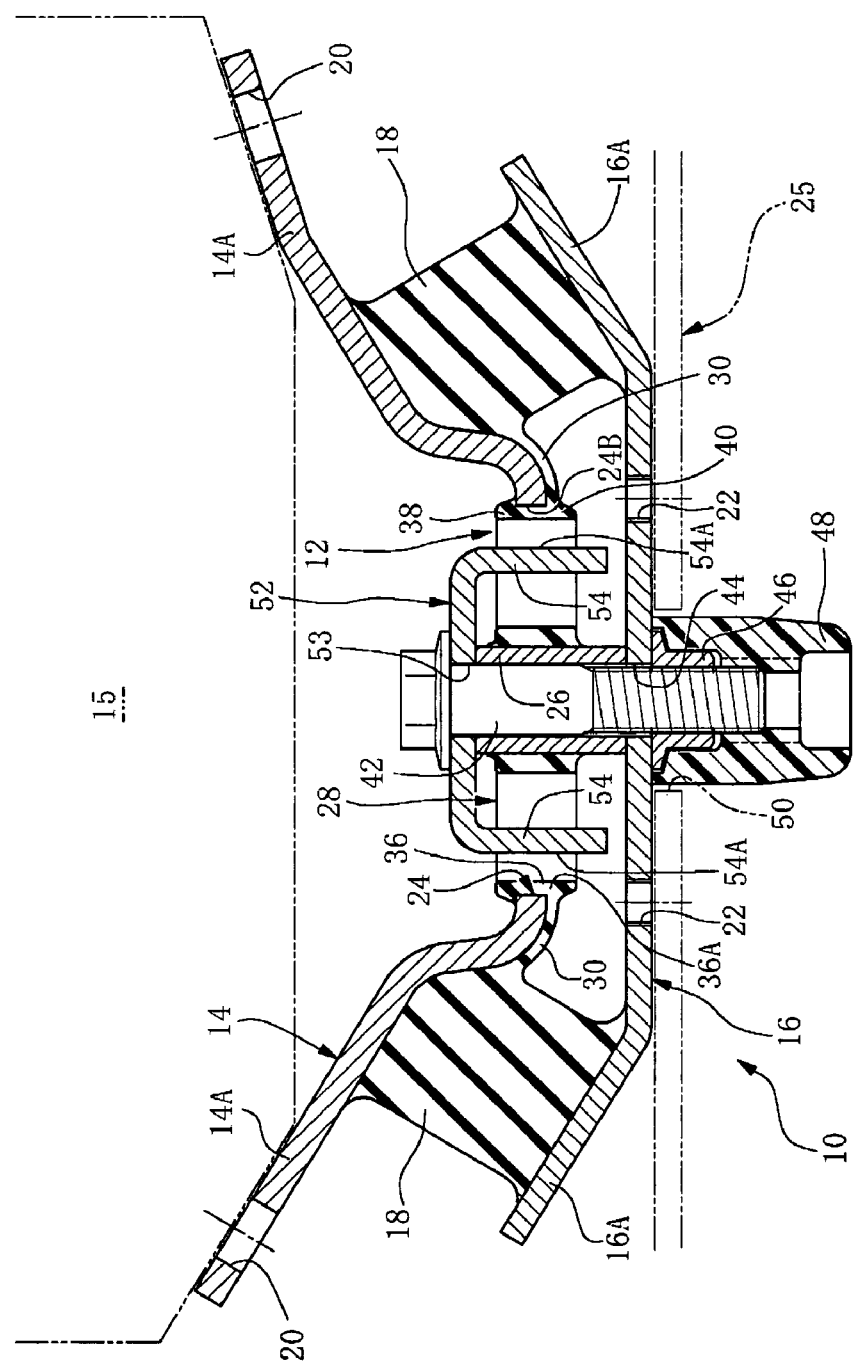
FIG. 3 is a vertical cross sectional view of the engine mount of FIG. 1.

In FIGS. 1-5, 10 denotes a mount body. In a first embodiment of the present invention, a vibration damping bushing 12 is integrally formed with the mount body 10. As depicted in FIG. 3, the mount body 10 comprises an upper fitting 14 and a lower fitting 16 of plate shape. A pair of rubber mount elements 18 of block shape disposed spaced apart in the left-right direction in the drawing. These rubber mount elements 18 are integrally vulcanization bonded with the upper fitting 14 and the lower fitting 16, while sandwiched vertically between the upper fitting 14 and the lower fitting 16.

The upper fitting 14 and the lower fitting 16 each bend upward on an incline at their two sides (the vehicle left-right direction), with the pair of rubber mount elements 18 being sandwiched respectively between the inclined portions 14A of the upper fitting 14 and the inclined portions 16A of the lower fitting 16. Specifically, by means of the pair of rubber mount elements 18, the upper fitting 14 and the lower fitting 16 are coupled in the vertical direction at their inclined portions 14A, 16A.

Each of the pair of rubber mount elements 18 has an overall form that widens out towards the bottom, resembling inverted rabbit ears. Each of the pair of rubber mount elements 18 of block shape has a rectangular cross section whose lengthwise extension is coincident with the front-back direction of the vehicle. Fastening holes 20, 22 are formed in the upper fitting 14 and the lower fitting 16, respectively, with the upper fitting 14 fastened to an engine 15 side at the fastening holes 20, and the lower fitting 16 fastened to the vehicle body 25 side at the fastening holes 22.

Figure 6:
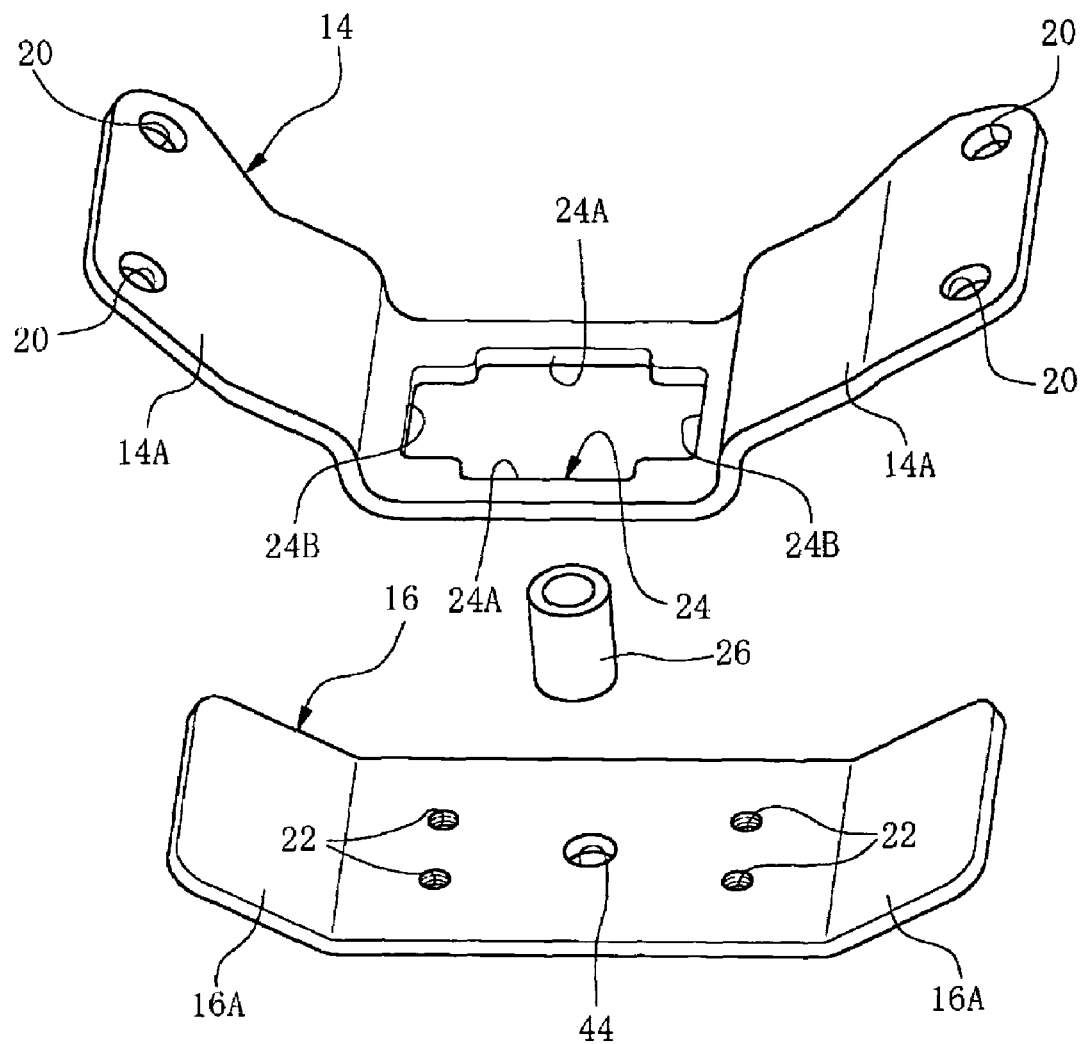
FIG. 6 is a perspective view showing an upper and lower fitting of the engine mount of FIG. 1.

As illustrated in FIGS. 3, 4A, 4B and 6, a vertical direction through-hole 24 is disposed in the upper fitting 14 at a medial location between the pair of rubber mount elements 18, with the vibration damping bushing 12 being integrally vulcanization molded to the upper fitting 14 at this through-hole 24 portion. As depicted in FIG. 6, front-back direction recesses 24A and left-right direction recesses 24B are formed in this through-hole 24.

As shown in FIGS. 3, 4A and 4B, the vibration damping bushing 12 has an inner tube fitting 26 positioned in the center of the through-hole 24, and a bushing rubber 28 coupling the inner tube fitting 26 and the upper fitting 14 in the diametrical direction. The bushing rubber 28 is integrally vulcanization bonded to the inner tube fitting 26 and to the upper fitting 14, specifically, to the peripheral edge of the through-hole 24. As illustrated in FIG. 4B, the bushing rubber 28 has hollow portions (recesses) 32 passing through it in axial direction at the left and right sides of the inner tube fitting 26. These hollow portions 32 serve to lower the spring constant of the bushing rubber 28 in the left-right direction. In the front-back direction, on the other hand, the inner tube fitting 26 and the upper fitting 14 are directly linked by leg portions 34. The leg portions 34 serve to increase the spring constant of the bushing rubber 28 in the front-back direction.

The bushing rubber 28 has a thin rubber layer 36 that extends along the peripheral edge of the through-hole 24 in the circumferential direction. The portions in the rubber layer 36 situated in the basal portions of the left and right recesses 24B constitute left-right direction rubber stopper portions 36A. The portions thereof situated in the pair of front and back wall portions of the recesses 24B constitute front-back direction rubber stopper portions 36B. As illustrated in FIG. 3 and FIGS. 4A and 4B, the bushing rubber 28 has axial length longer than the thickness of the upper fitting 14, and in its entirety, including the leg portions 34, projects upwardly and downwardly from the upper fitting 14. FIG. 4A shows a protruding portion 38 that projects upward from the upper face of the upper fitting 14, and a protruding portion 40 that projects downward from the lower face of the upper fitting 14. In the upward protruding portion 38, those portions in situated in vertical opposition to front-back direction stopper pieces 56 of a stopper fitting 52, described later, constitute vertical direction (rebound direction) rubber stopper portions 38C (see FIG. 2, FIG. 5).

Figure 5:
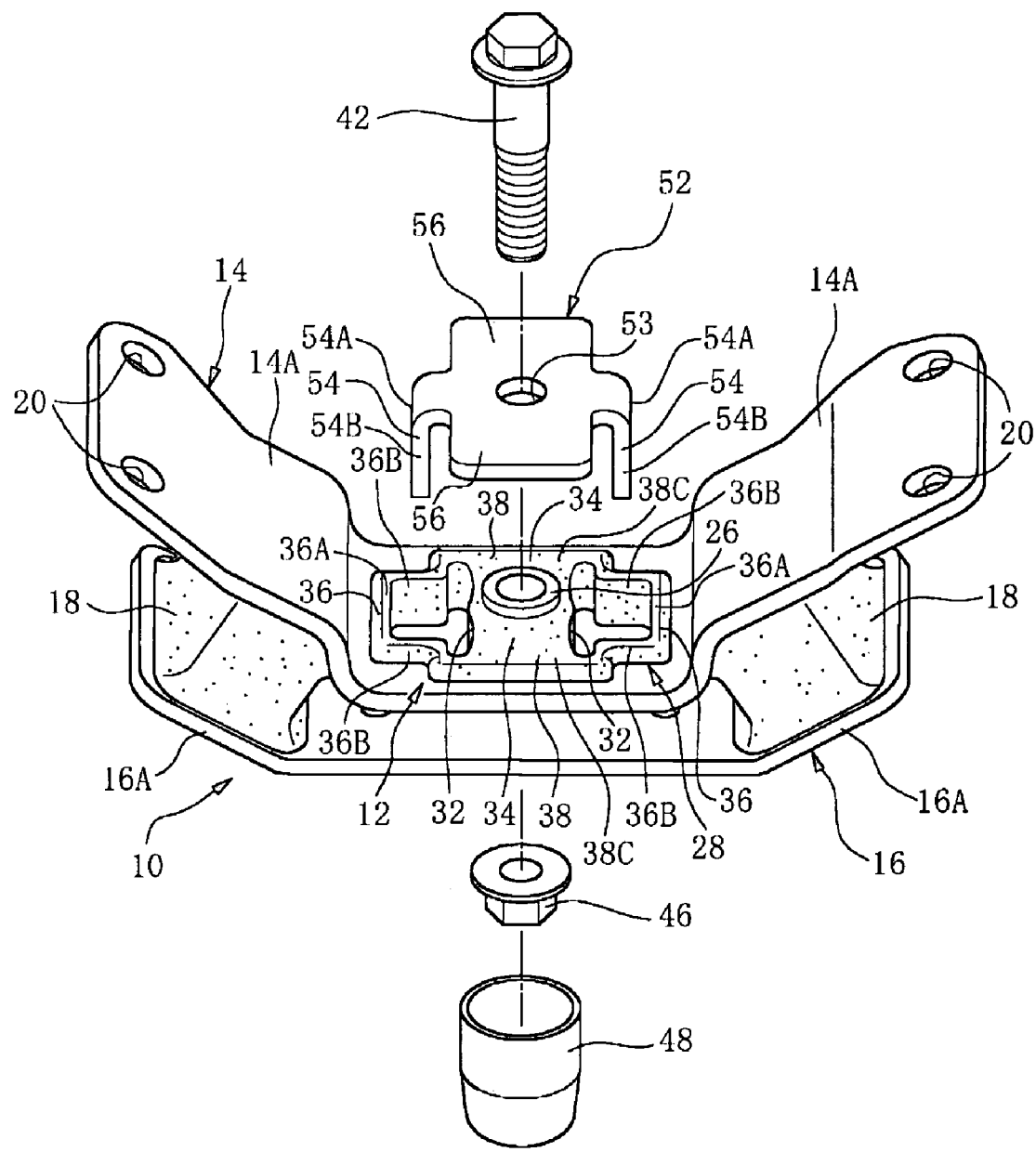
FIG. 5 is a perspective exploded view showing the engine mount of FIG. 1 that is in a pre-assembly state.

As shown in FIGS. 4A and 4B, the vibration damping bushing 12 is subjected to vulcanization molding in a state with the lower end of the inner tube fitting 26 in the drawing in abutment against the lower fitting 16. In this state, as depicted in FIGS. 3 and 5, a bolt 42 is passed through the inner tube fitting 26, with the distal end thereof passed through the through-hole 44 in the lower fitting 16 and a nut 46 threaded thereon, thereby fastening the inner tube fitting 26 to the lower fitting 16 by means of a fastening arrangement composed of the bolt 42 and the nut 46.

In FIG. 3, 48 denotes a tubular cap made of resin attached to the distal end of the bolt 42. This cap 48 is passed through a positioning hole 50 in the vehicle body 25, and in cooperation with the positioning hole 50 regulates the position of the engine mount relative to the vehicle body 25.

As shown in FIG. 3, a stopper fitting 52 is affixed to the inner tube fitting 26. As shown in FIG. 5 as well, this stopper fitting 52 has a through-hole 53 in its center. By passing the bolt 42 therethrough and threading on the nut 46, the stopper fitting 52 moves in unison with the inner tube fitting 26. The stopper fitting 52 is a plate shaped member, and as depicted in FIGS. 1, 3 and 5, has a pair of stopper pieces 54 that inflect downward and project into the aforementioned pair of hollow portions 32 of the bushing rubber 28.

The pair of left and right stopper pieces 54 constitute fitting stopper portions in the left-right direction and front-back direction of the vehicle, with the left and right outside faces of the stopper pieces 54 abutting the left and right rubber stopper portions 36A in the bushing, to constitute stopper faces 54A (see FIG. 2) that in cooperation with the rubber stopper portions 36A limit displacement in the left-right direction. Additionally, the end faces in the front-back direction abut the front and back direction rubber stopper portions 36B of the bushing rubber 28, to constitute front-back direction stopper faces 54B that in cooperation therewith limit displacement in the front-back direction. That is, the downwardly inflected stopper pieces 54 constitute left-right and front-back direction fitting stopper portions.

As illustrated in FIGS. 1, 2 and 5, the stopper fitting 52 also has integral stopper pieces 56 that project in the front-back direction. These stopper pieces 56 constitute vertical direction fitting stopper portions. Specifically, these stopper pieces 56, with the lower faces thereof constituting stopper faces in the vertical direction, are placed with the stopper faces 56C (see FIG. 2) thereof abutting against the aforementioned rubber stopper portions 38C, to limit in cooperation therewith relative displacement of the inner tube fitting 26 in the vertical direction. Specifically, they function to limit relative displacement of the upper fitting 14 and the lower fitting 16 in the vertical direction, and thus limit vertical displacement of the rubber mount elements 18 and the bushing rubber 28 in the vertical direction.

According to this embodiment, by means of abutting action of the stopper pieces 54 and the rubber stopper portions 36A, 36B, displacement of the bushing rubber 28 in both the front-back and the left-right directions can be reliably limited to no more than a certain level, and the problem of diminished durability due to appreciable deformation of the bushing rubber 28 in these directions can be solved satisfactorily. Additionally, in this embodiment, since the rubber mount elements 18 and the bushing rubber 28 are integrally vulcanization molded of the same rubber material, fewer vulcanized components are needed, as are fewer assembly steps, and the manufacturing costs of the engine mount can be reduced.

In this embodiment as well, stopper pieces 56 are disposed on the stopper fitting 52, while on the upper fitting 14 side, more specifically the bushing rubber 28 integrally formed therewith, there are disposed corresponding vertical direction rubber stopper portions 38C, with displacement in the vertical direction being limited by these elements, so as to solve the problem of diminished durability in association with excessive displacement in the vertical direction. Also, in this embodiment since the rubber stopper portions 36A, 36B, 38C are constituted by portions of the bushing rubber 28 itself, there is the advantage of a simpler arrangement for the engine mount.

In this embodiment, the vibration damping bushing 12 takes a form in which one end of the inner tube fitting 26 is abutting the lower fitting 16 with no gap therebetween during vulcanization molding. Where vulcanization molding of the rubber mount elements 18 and the bushing rubber 28 is carried out using a mold in a state producing a gap between the inner tube fitting 26 and the lower fitting 16, part of the rubber will creep around to the end face of the inner tube fitting 26 due to the gap, creating the problem of leaving rubber burr.

Figure 7:
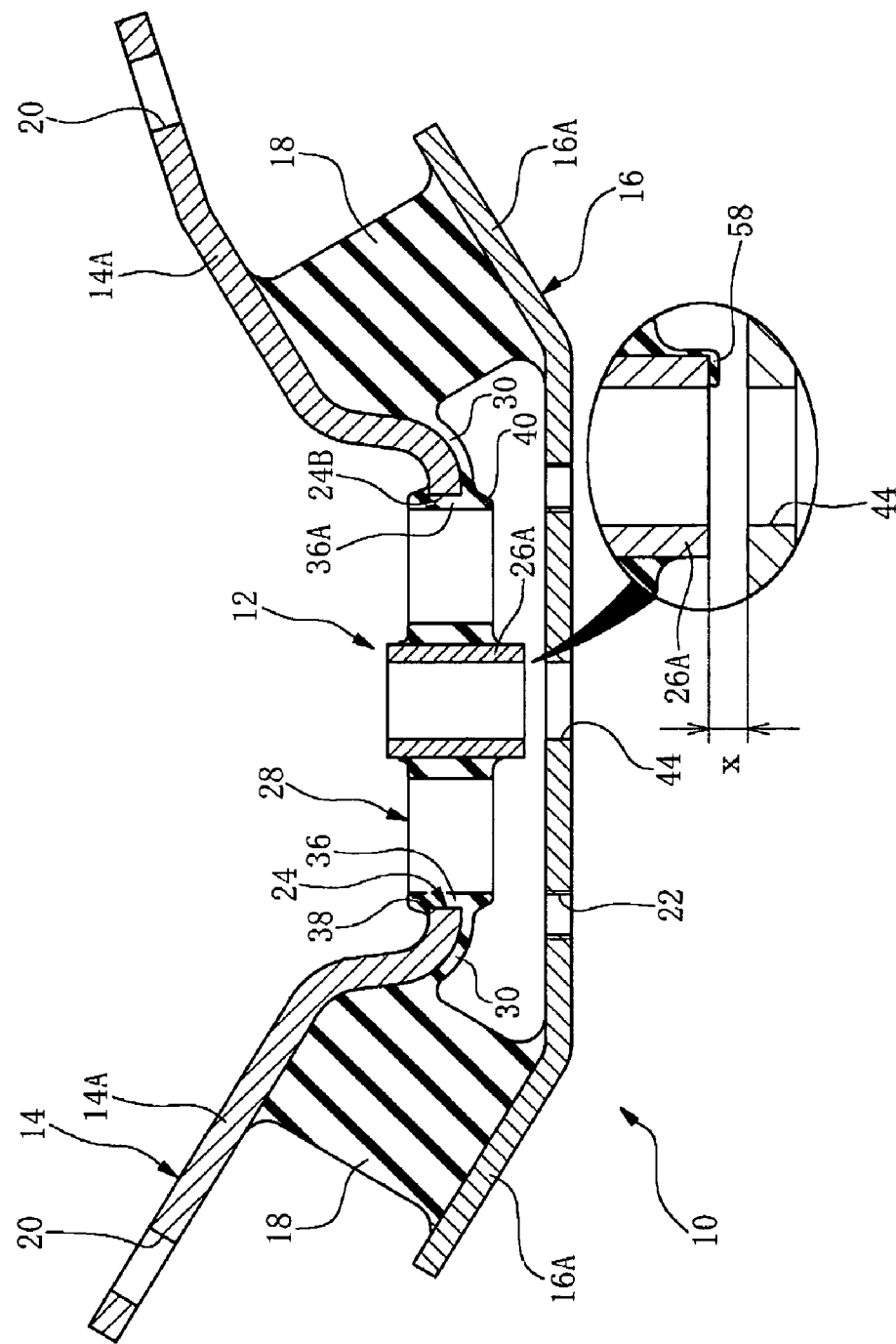
FIG. 7 is a cross sectional view of a comparative example of an engine mount.
Figure 8A:
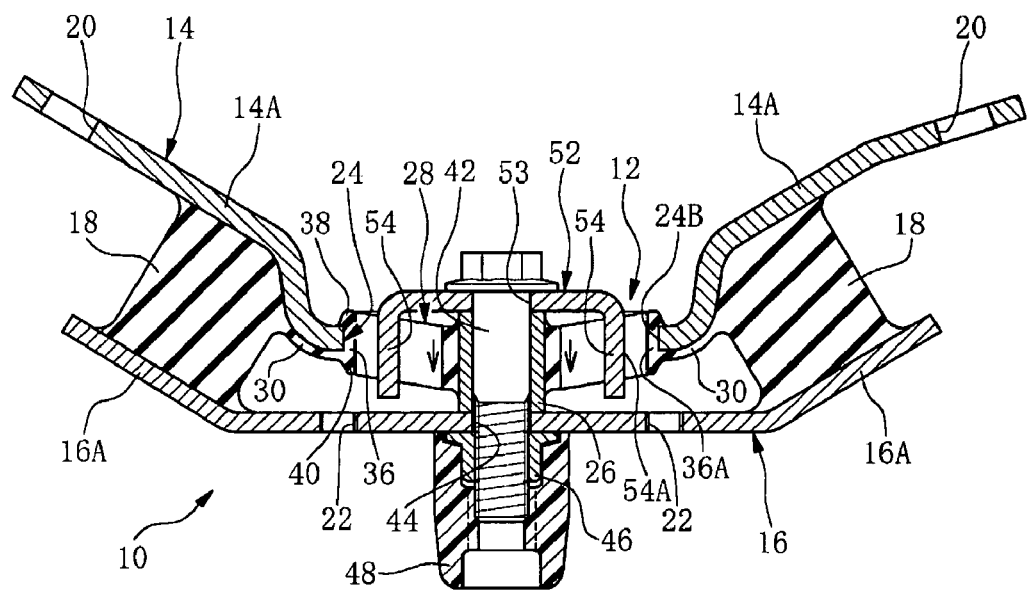
FIGS. 8A and 8B show operation states of the engine mount of FIG. 7, respectively.

FIG. 7 illustrates a comparative example to the embodiment discussed above, and depicts an example of a gap X produced between the inner tube fitting 26A and the lower fitting 16 in its condition after vulcanization but prior to installation in a vehicle. In the case of the engine mount of this example, when the inner tube fitting 26A is fastened to the lower fitting 16 by means of a bolt 42 and a nut 46, the center portion of the bushing rubber 28 becomes pulled downward as depicted in FIG. 8A, temporarily creating strain in the vertical direction in the bushing rubber 28.

Figure 8B:
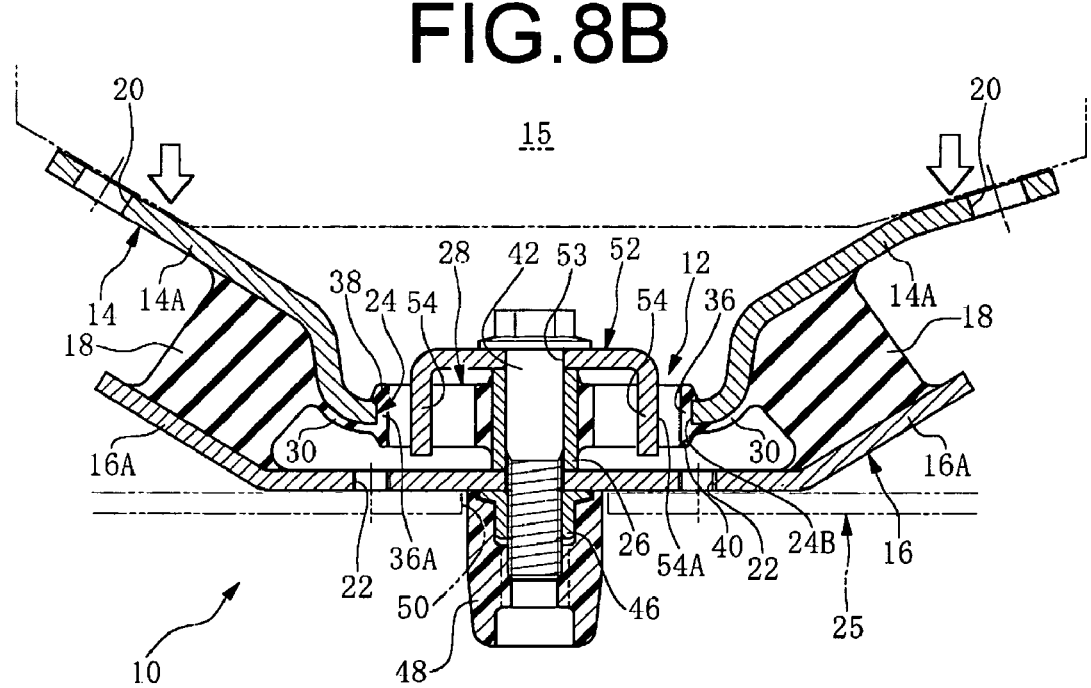
Figure 10A:
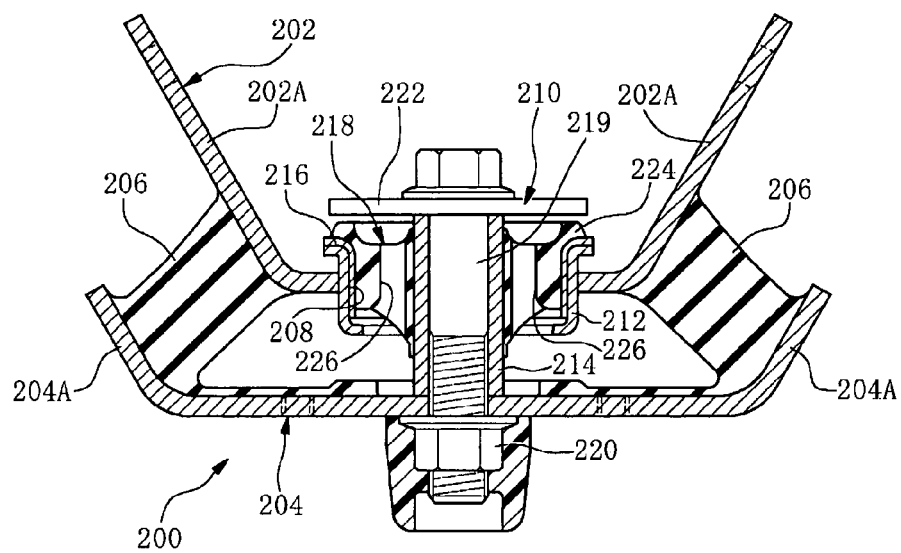
FIGS. 10A and 10B illustrate a conventional engine mount.
Figure 10B:
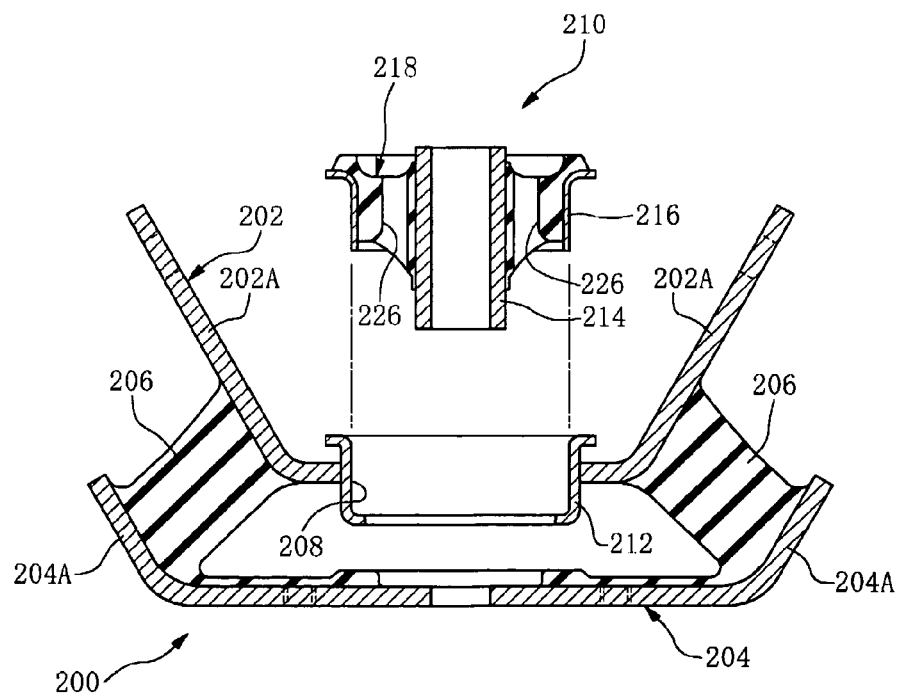

However, as depicted in FIG. 8B, when the upper fitting 14 is subjected to downward engine load when subsequently attached to the engine 15, the rubber mount elements 18 flex in the same direction, at which point in time the strain created in the bushing rubber 28 is eliminated. Accordingly, during service of the engine mount, diminished durability of the bushing rubber 28 due to initial strain can be avoided.

However, where on the other hand the engine mount is subjected to vulcanization molding in the form depicted in FIG. 7, the rubber material for forming the bushing rubber 28 creeps around to the lower end face of the inner tube fitting 26A in the drawing, producing rubber burr 58. When such rubber burr 58 occurs, the rubber burr 58 is difficult to remove, due to the fact that the gap X is small. On the other hand, if with the rubber burr 58 left in place the inner tube fitting 26 is fastened to the lower fitting 16 by means of the bolt 42 and the nut 46, unification of the inner tube fitting 26A and the lower fitting 16 will be impaired.

According to the embodiment depicted in FIGS. 1-6, the inner tube fitting 26 and the lower fitting 16 are in a state of abutment during vulcanization, whereby the problem of rubber creeping around the end face and forming rubber burr 58 can be solved.

In the preceding embodiment, the leg portions 34 in the bushing rubber 28 extend in the front-back direction, linking the inner tube fitting 26 and the upper fitting 14 in the front-back direction, with the leg portions 34 providing increased rubber elasticity in the engine mount in the front-back direction, and hence increased spring constant in the front-back direction, so as to hold to a low level displacement the upper fitting 14 and the lower fitting 16 in that direction; particularly in the case of a sports car or the like, during cornering or similar maneuvers, the rubber mount elements 18 and the bushing rubber 28 may be subjected to appreciable input in the left-right direction, and in such instances, it is possible to extend the leg portions 34 in the left-right direction, and to link the inner tube fitting 26 and the upper fitting 14 in the vibration damping bushing 12 in the left-right direction by means of the leg portions 34.

In this case, the leg portions 34 may be disposed in the left-right direction only. Alternatively, the leg portions 34 may be disposed in both the front-back direction and the left-right direction, so as to provide higher spring constant in both the front-back direction and the left-right direction of the vehicle.

FIG. 9 depicts another embodiment of the invention, wherein a circular through-hole 24 is disposed in the upper fitting 14, and a circular bushing rubber 28 integrally connected to the rubber mount elements 18 by communicating portions 30 is integrally vulcanization molded with the rubber mount elements 18, using the same rubber material. The circular bushing rubber 28 comprises a pair of left and right arcuate hollow portions 32; leg portions 34 connecting the inner tube fitting 26 and the upper fitting 14 in the vehicle front-back direction; and a relatively thin rubber layer 36 extending along the peripheral edge of the through-hole 24.

In this embodiment, a stopper fitting 60 fastened to the inner tube fitting 26 by a bolt 42 and a nut 46 has a stopper piece 56 extending in cantilever fashion upward in FIG. 9 (towards the front of the vehicle). Meanwhile, on the upper face of the upper fitting 14, there is formed an extended portion 62 that extends the upward-facing protruding portion 38 of the bushing rubber 28 in the upward direction of FIG. 9, with the portion of this extended portion 62 situated in opposition to the stopper piece 56 constituting a vertical direction rubber stopper portion 38C.

In the fragmentary enlarged view of FIG. 9, 56C denotes the vertical direction the stopper face of the lower face of the stopper piece 56. Meanwhile, there is disposed on the upper fitting 14 a protruding piece 64 that protrudes upward in the drawing (towards the front of the vehicle) from a medial location in the left-right direction, with a second through-hole 66 disposed in this protruding piece 64. A thin rubber layer 68 formed along the inside periphery of this through-hole 66 is integrally vulcanization molded with the bushing rubber 28 and the rubber mount elements 18, connected via the extended portion 62. The left and right portions of the thin rubber layer 68 in FIG. 9 constitute left-right direction rubber stopper portions 68A, while the front and back portions constitute front-back direction rubber stopper portions 68B.

Meanwhile, there is integrally formed a second stopper piece 54 that inflects downward from the distal end of the aforementioned stopper piece 56 and enters the through-hole 66, the second stopper piece 54 constituting fitting stopper portions for the left-right and front-back directions. Specifically, the left and right end faces of the stopper piece 54 constitute left-right direction stopper faces 54A, and the front and back faces thereof constitute front-back direction stopper faces 54B.

While the stopper pieces 54, 56 are provided by means of the stopper fitting 52 bolted to the inner tube fitting 26 in the illustrated embodiments, these stopper pieces may be integrally formed with the inner tube fitting 26. This makes it possible to minimize the number of components of the engine mount. In this case, the stopper piece may be formed by an outer peripheral portion of annular outward flange integrally formed on the upper end of the inner tube fitting 26, while the through-hole 24 formed through the upper fitting 14 has an axially extended tubular shape, in stead, thereby providing a sufficient area to provide a stable stopper function.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

What is claimed is:

1. An engine mount comprising:
    a mount body including an upper fitting and a lower fitting of plate shape, and a pair of rubber mount elements of block shape, positioned spaced apart from one another while sandwiched above and below by the upper fitting and the lower fitting, and integrally vulcanization bonded to the upper fitting and the lower fitting; and
    a vibration damping bushing including an inner tube fitting situated within a through-hole in the upper fitting, formed at a location between the pair of rubber mount elements, and a bushing rubber integrally vulcanization bonded with the inner tube fitting and the upper fitting, and connecting the inner tube fitting and the upper fitting in a diametrical direction, the inner tube fitting being fixed to the lower fitting, wherein
    the pair of rubber mount elements and the bushing rubber are integrally vulcanization molded of identical rubber material while connected to each other,
    at least one of a vehicle front-back direction stopper portion and a left-right direction stopper portion is fixedly provided on a side of the inner tube fitting, while a corresponding rubber stopper portion is fixedly provided on a side of the upper fitting so that the stopper portion and the rubber stopper portion are able to come into abutment with each other in at least one of a vehicle front-back direction and a left-right directions, a stopper fitting is affixed to the inner tube fitting and provides at least one of a vehicle front-back direction fitting stopper portion and a left-right direction fitting stopper portion in order to function as the stopper portion, and axial direction hollow portions are disposed in the bushing rubber, and the stopper fitting includes stopper pieces inserted into the hollow portions and constituting the at least one of the vehicle front-back direction fitting stopper portion and the left-right direction fitting stopper portion in order to function as the stopper portion, while peripheral edge portions of the hollow portions in the bushing rubber constitute the corresponding rubber stopper portion.

2. An engine mount according to claim 1, wherein the stopper fitting further provides a vertical direction fitting stopper portion, and a corresponding vertical direction rubber stopper portion is disposed on the upper fitting side so as to be able to come into abutment with the vertical direction fitting stopper portion in a vertical direction.

3. An engine mount according to claim 2, wherein the stopper fitting includes a stopper piece extending along an upper face of the upper fitting from an end face of the inner tube fitting on an opposite side from the lower fitting, with the stopper piece constituting the vertical direction fitting stopper portion, while a protruding portion that protrudes upward from the upper face of the upper fitting is formed along a peripheral edge of the through-hole in the bushing rubber, with the protruding portion constituting the vertical direction rubber stopper portion.

4. An engine mount according to claim 1, wherein the vibration damping bushing is subjected to vulcanization molding in a state with one end of the inner tube fitting on the lower fitting side being disposed in abutment with the lower fitting with no gap therebetween, prior to attachment to a vehicle and during molding.

5. An engine mount comprising:

a mount body including an upper fitting and a lower fitting of plate shape, and a pair of rubber mount elements of block shape, positioned spaced apart from one another while sandwiched above and below by the upper fitting and the lower fitting, and integrally vulcanization bonded to the upper fitting and the lower fitting; and a vibration damping bushing including an inner tube fitting situated within a through-hole in the upper fitting, formed at a location between the pair of rubber mount elements, and a bushing rubber integrally vulcanization bonded with the inner tube fitting and the upper fitting, and connecting the inner tube fitting and the upper fitting in a diametrical direction, the inner tube fitting being fixed to the lower fitting, wherein the pair of rubber mount elements and the bushing rubber are integrally vulcanization molded of identical rubber material while connected to each other, the upper fitting includes a protruding piece having a through-hole axially perforating therethrough, the through-hole being coated by a thin rubber layer to provide a rubber stopper portion, and a stopper fitting is affixed to the inner tube fitting, and extends radially outward so that a distal end is bent to be disposed within the through hole of the protruding piece so that the distal end of the stopper fitting provides a stopper portion that is brought into contact against the rubber stopper portion in at least one of a vehicle front-back direction and a left-right direction.

* * * * *